June 21, 1927.
C. S. BRAGG ET AL
1,633,360
THROTTLE CONTROL APPARATUS FOR BRAKE APPLYING MECHANISM
Filed June 19, 1926    3 Sheets-Sheet 1
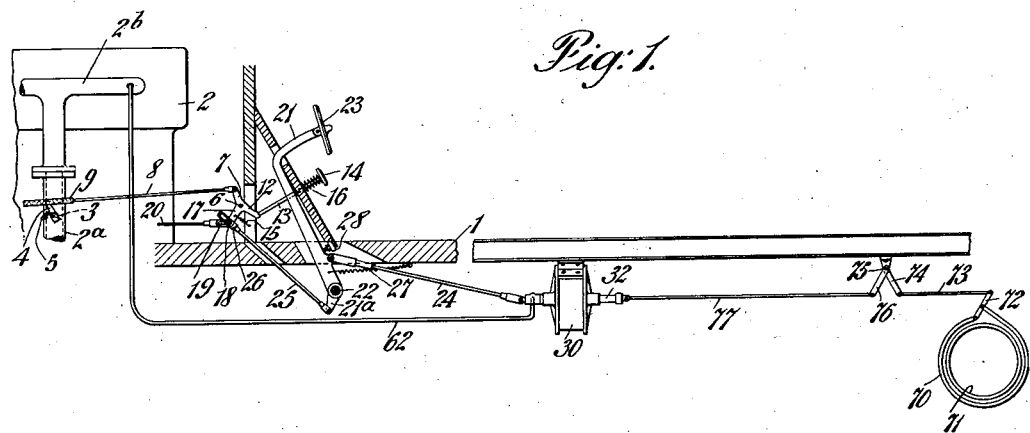
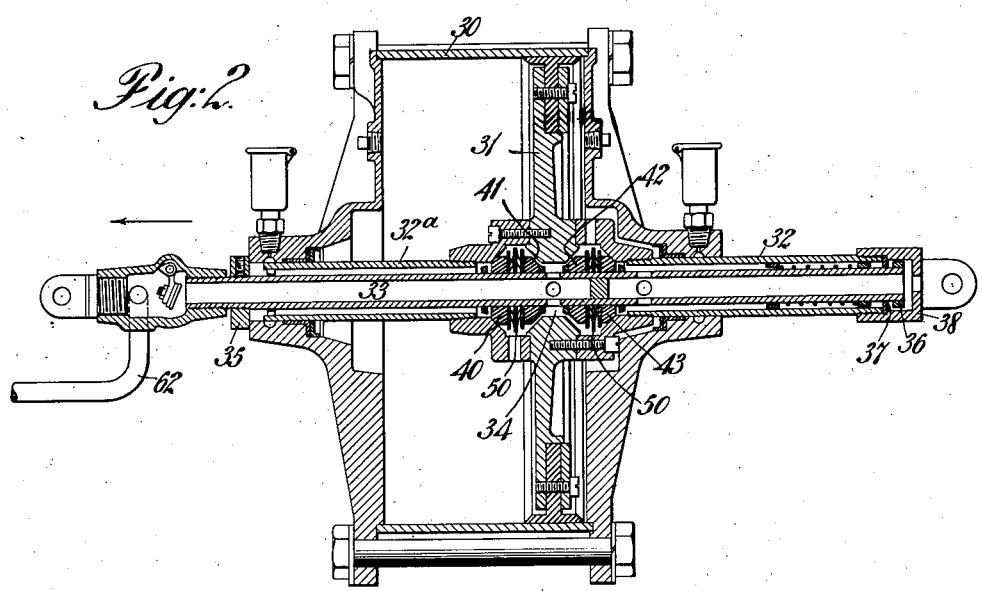
INVENTORS
Caleb S. Bragg
Victor W. Kliesrath
BY Louis Prevost Whitaker
ATTORNEY June 21, 1927.  
C. S. BRAGG ET AL  
1,633,360  
THROTTLE CONTROL APPARATUS FOR BRAKE APPLYING MECHANISM  
Filed June 19, 1926  
3 Sheets-Sheet 2

June 21, 1927.                                                          1,633,360
                         C. S. BRAGG ET AL
           THROTTLE CONTROL APPARATUS FOR BRAKE APPLYING MECHANISM
                    Filed June 19, 1926         3 Sheets-Sheet 3

INVENTORS
Caleb S. Bragg
Victor W. Kliesrath
Louis Hurwood Whitaker
ATTORNEY

Patented June 21, 1927.

1,633,360

UNITED STATES PATENT OFFICE.

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND, NEW YORK, A CORPORATION OF NEW YORK.

THROTTLE-CONTROL APPARATUS FOR BRAKE-APPLYING MECHANISM.

Application filed June 19, 1926. Serial No. 117,026.

Our invention consists in the novel features hereinafter described, reference being had to the accompanying drawings which illustrate several forms or embodiments of our invention selected by us for purposes of illustration, and the said invention is fully disclosed in the following description and claims.

The object of our invention is to provide, in connection with a vacuum operated device for operating the brake mechanism of an automotive vehicle deriving its suction from a connection with the intake manifold of an internal combustion engine for propelling the vehicle, means for automatically throttling the internal combustion engine whenever the brake mechanism is applied. This is preferably accomplished by connecting the throttle valve of the engine with the operator operated lever for operating the brake mechanism, which lever is preferably connected with the reversing valve mechanism of the vacuum operated device, and also with the brake mechanism, by means permitting sufficient lost motion to effect the operation of the valve mechanism, so that each time the brake mechanism is applied, the throttle valve will be closed, thereby insuring the maximum suction in the connection between the vacuum operated device and the intake manifold, the connection of which with the manifold is between the throttle valve and the engine cylinders. The throttle valve is also provided preferably with an adjustable stop, to prevent its closing beyond a position which will permit the engine to idle, so as to prevent stalling the engine, which would put an end to the suction upon which the vacuum operated device depends for its operation, and suitable yielding means are conveniently provided in the connections between the operator operated part and the throttle valve, to prevent injury to the valve by any movement of the brake or pedal lever beyond that sufficient to move the valve into its normal closed position, in contact with the aforesaid stop.

It is to be understood, that where the ordinary throttle valve which is connected with the operator operated part, as the brake pedal lever, is also connected with the usual hand operated control and foot accelerator, that the connection between the brake lever and the throttle valve will not interfere with the use of the hand control and foot control in the usual manner, while the brake lever is in off position, but that the operation of the brake pedal lever will take the throttle valve from the control of both the hand lever and accelerator, and close the throttle valve, regardless of the positions in which the hand lever and accelerator may have occupied.

Our invention also contemplates the employment of an auxiliary throttle valve connected with the brake pedal lever in the manner described, in which case the auxiliary throttle valve only is operated by the brake pedal lever, without interfering with the connections between the normal or main throttle valve, and its usual hand lever and accelerator.

Our invention also contemplates the employment of means for effecting the closing of the throttle valve by positively retracting the accelerator, to permit the throttle valve to close when the brake pedal lever is actuated.

Our invention is also applicable to automotive vehicles provided with brake mechanism operated directly by the brake pedal lever, without the intervention of the vacuum operated device, although it is specially advantageous in connection with vehicles provided with such vacuum operated device as before described, and it will be understood, that where the vacuum operated device is employed, the pedal lever is preferably connected with the brake mechanism as above set forth, so that the brake mechanism may be directly applied by the physical power of the operator in case of failure of power, and in such case as in the case where the brake lever is connected with the brake mechanism, without the intervention of a vacuum operated device, the automatic closing of the throttle valve will slow down the engine, and co-operate with the brake mechanism in reducing the speed of the vehicle, or bringing it to a stop.

Our invention also comprises certain new and useful constructions and combinations of parts hereinafter fully described, and particularly pointed out in the claims.

In the accompanying drawings,

Fig. 1 is a diagrammatic view illustrating an installation in an automotive vehicle provided with an internal combustion engine, brake mechanism, and vacuum operated device therefor, and having our present invention embodied therein.

Fig. 2 is an enlarged sectional view illustrating the vacuum operated device shown in Fig. 1.

Figure 3:
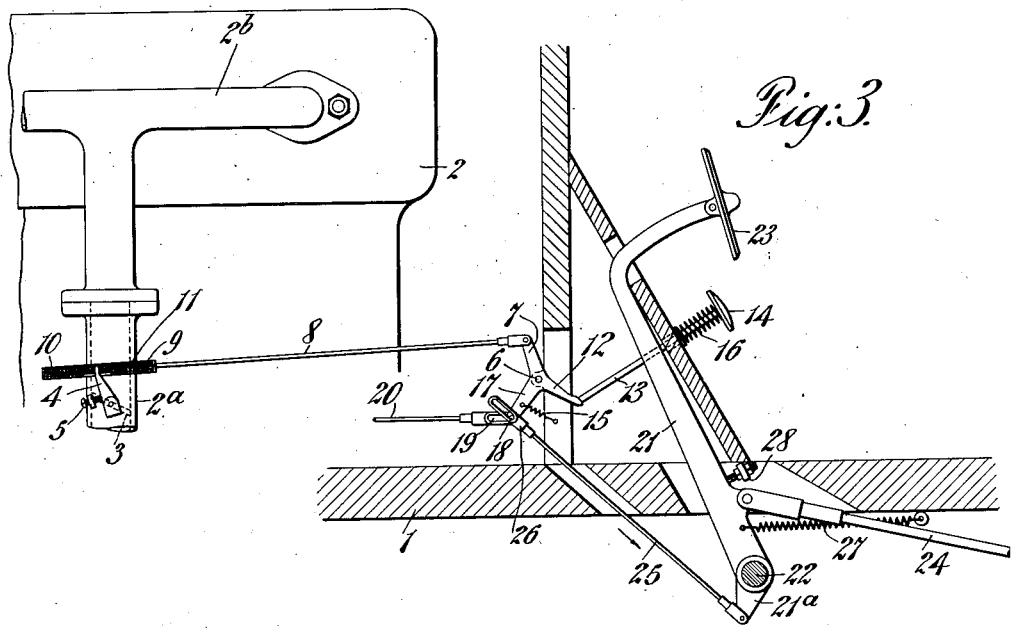
Fig. 3 is an enlarged detail elevation of the mechanism for automatically effecting the closing of the throttle valve, shown in Fig. 1.

In the form of our invention shown in Figs. 1, 2 and 3, 1 represents the frame or chassis of an automotive vehicle, propelled by an internal combustion engine, indicated at 2, and provided with the usual suction passage, 2ª, connecting the carburetor (not shown) with the intake manifold, 2ᵇ. 3 represents the usual throttle valve, which may be of usual or any preferred form. As herein indicated, it consists of the usual butterfly valve pivoted in the wall of the passage, 2, and provided with an operating arm, 4, adapted to engage an adjustable stop, 5, to arrest the throttle valve in proper position for idling the engine. 6 represents a rocker pivotally mounted in a part of the chassis, and having an arm, 7, connected by a link rod, 8, with the throttle valve operating arm, 4. The forward end of the link rod, 8, is provided with a sleeve, 9, and closing springs 10 and 11, one forward of and the other in rear of the arm, 4, to prevent straining or breaking the arm or the stop, 5. The rocker, 6, is also provided with the usual operating arm, 12, engaged by the accelerator pin, 13, mounted in the foot board, and provided with the usual mushroom head or button, 14, and retracting spring, 15, is preferably connected with an arm, 17, of the rocker, and normally holds it in such position that the throttle valve is in the closed or idling position, as shown. The accelerator pin may also be provided with a retracting spring, 16, if desired. The rocker arm, 17, is connected in the usual manner with a hand operated control lever (not shown), usually located on the steering wheel. In this instance, the arm, 17, is shown provided with a stud, 18, engaging a slotted portion, 19, of a link rod, 20, connected to the hand operated throttle lever in any desired manner. The hand lever is ordinarily so constructed that it will be frictionally held in any position to which it is moved, and the slotted portion, 19, of the link rod, 20, permits the throttle valve to be opened to a greater extent by the accelerator pin, without moving the hand lever, as is usual. It follows from this construction, which is the usual one in automobiles, if the hand lever has been moved to open the throttle valve more or less, and the operator removes his foot from the accelerator button and applies the brake, the retracting spring, 15, would only return the throttle valve toward the closed position as far as the adjusted position of the link, 20, and hand throttle lever would permit, and if the hand throttle lever were in wide open position, the spring, 15, would not close the throttle valve at all, as the spring, 15, is not strong enough to overcome the frictional resistance of the ordinary hand throttle lever. Therefore, in the ordinary constructions now in use, the throttle valve is usually opened to a greater or less extent when the operator applies the brakes, depending upon the position of the hand throttle lever, (and it may be wide open), unless the hand throttle lever is kept in closed position, or moved in closed position when the brakes are applied, which would require a separate operation by the driver, and in an emergency may be overlooked. Our present invention, therefore, provides for effecting the automatic closing of the throttle valve overcoming the frictional resistance of the hand operated throttle control lever, or independently thereof, whenever the brake pedal lever is operated in a direction to apply the brakes, regardless of the positions occupied by the accelerator, the hand operated throttle lever, or any other mechanism connected with the throttle valve.

Our invention is peculiarly applicable to installations in an automotive vehicle, in which the brakes are operated by a vacuum operated device or power actuator, as in the installation illustrated in Fig. 1. 21 represents the brake pedal lever or other operator operated device for applying the brakes pivoted to the chassis, at 22, and provided with the pedal, 23. This brake lever, 21, is connected with the brake mechanism by a link rod, 24, either directly, or the link rod may be operatively connected to the valve mechanism of a power actuator for applying the brakes by power, as indicated for example in Figs. 1 and 2, in which one form of power actuator is shown. Any desired form of vacuum operated device may be employed, and its particular details form no part of our present invention. We have shown in Fig. 1, a double acting power actuator of the kind covered by our former applications for Letters Patent of the United States filed December 22, 1923, Serial No. 682,346, filed October 2, 1925, Serial No. 60,018, filed October 20, 1925, Serial No. 63,696, for example. Briefly stated, the actuator herein shown comprises a cylinder, 30, closed at both ends, and provided with a double acting piston, 31, having hollow piston rods, 32 and 32ª, extending through stuffing boxes in the opposite cylinder heads, the piston rod, 32, being connected by a link, 77, with the brake mechanism of the vehicle, which may be of any desired type, and may comprise brake mechanism for any desired number of wheels. The brake mechanism is diagrammatically represented in Fig. 1, by a brake drum, 71, brake band, 70, brake applying lever, 72, connected by a link, 73, with an arm, 74, on a rock shaft 75, provided with an arm, 76, to which the link, 77, is connected. Means are provided for connecting the cylinder on opposite sides of the piston with the atmosphere, and with the suction pipe, 62, leading to the intake manifold and connected thereto, between the throttle valve and the engine cylinders under the control of reversing valve mechanism, by which differential pressures are established on opposite faces of the piston. In this instance, the reversing valve mechanism comprises suction valves 41 and 42, and air inlet valves, 40 and 43, normally pressed toward their seats by springs, 50, said valves being operated by a longitudinal movable valve sleeve, 33, connected with the suction pipe, 62, and communicating with a centrally located suction chamber, 34, in the piston hub between the suction valves, 41 and 42. These valves are preferably of molded rubber, and are so arranged that the movement of the sleeve, 33, in either direction, will move one suction valve and one air inlet valve in a direction to open them. The valve sleeve, 33, is also provided with a stop collar, 35, which preferably holds the sleeve in such position, when the piston, 31, is retracted, that the suction valves, 41 and 42, are opened slightly, so that the piston is normally submerged in vacuum when in off position. Atmospheric air is admitted to the orifices controlled by the air inlet valves, 40 and 43, through the hollow piston rods, which are provided with orifices at their outer ends for the purpose. (This construction, however, is not claimed herein, as it is specifically claimed in another application filed by us November 13, 1926, and given Serial No. 148,156, as a division of our former application filed April 16, 1925, and given Serial No. 23,459.) The valve actuating sleeve, 33, is connected in this instance by the link rod, 24, with the pedal lever, 21. The brake lever is also connected with the brake mechanism by means permitting lost motion, so that the operator may add his physical force to that of the actuator, and may also positively apply the brakes by his physical force, in case of the failure of the power actuator. This may be accomplished in various ways, but in this instance as shown in Fig. 2, the rear end of the valve actuating sleeve is provided with a collar, 36, which has a limited movement between an inwardly projecting collar, 37, secured to the hollow piston rod, 32, and the outer end of a recess in a cap, 38, with which said piston rod is provided. As before stated, the specific details of this vacuum operated device form no part of our present invention, and are not claimed herein, and will not be more particularly described.

The brake pedal lever, 21, is shown as provided with an arm, 21ª, connected with the throttle valve actuating mechanism, in this instance, by a link rod, 25, having a slotted portion, 26, engaging the pin, 18, (or a separate pin, as preferred) on the arm, 17, of the rocker. The slotted portion, 26, is so arranged that when the pedal lever is in its normal or retracted position, shown in Fig. 1, in which it is yieldingly held by the usual retracting spring, 27, against an adjustable stop, 28, the throttle valve may be opened more or less, as desired, by either the hand operated link, 20, or the accelerator, 14. When, however, the brake pedal lever, 21, is depressed, the arm, 21ª, and link rod, 25, will cause the slotted portion, 26, to move in the direction of the arrow in Fig. 3, and as soon as the end of the slot engages the stud, 18, no matter how far open the throttle valve may be, the rocker will be positively shifted, and the throttle valve will be moved toward or to the closed or idling position, depending upon the extent of movement of the pedal lever overcoming the frictional resistance of the usual hand operated lever, or the resistance of any other mechanism connected with the throttle.

It will be understood, that the depression of the pedal lever, 21, draws the link rod, 24, and the valve actuating sleeve, 33, of the actuator forward, in the direction of the arrow in Fig. 2, further opening the suction valve, 41, closing suction valve, 42, and opening air inlet valve, 43, placing the cylinder, 30, forward of the piston in connection with the intake manifold, and admitting atmospheric air to the cylinder in rear of the piston. The simultaneous closing of the throttle valve insures the maximum suction in the manifold, and the piston, 31, will be instantly actuated to apply the brakes, moving forward until the forward movement of the pedal lever ceases, when the movement of the piston will cease. On the release of the pedal lever, it will be retracted by a spring, 27, shifting the valve actuating sleeve in the opposite direction, to the right in Fig. 2, and reversing the directions between the atmosphere and the cylinder, and the suction pipe, 62, and the cylinder, when the air previously admitted to the actuator will be withdrawn through the suction pipe, and the piston will be returned to its retracted position.

It will be understood, that the closing of the throttle valve not only increases the degree of rarefication in the manifold and facilitates the operation of the vacuum operated device, but also tends to reduce the speed of the engine, and consequently the speed of the car co-operates with the brake mechanism in reducing the speed of the vehicle, or in bringing it to a stop. Even in case of the failure of the power actuator to operate for any reason, the forward movement of the pedal lever would set the valve so as to vent the cylinder, 30, of the power actuator, and as soon as the lost motion between the valve actuating sleeve and the piston rod was taken up, the brake mechanism could be directly applied by the physical power of the operator, in which case the simultaneous closing of the throttle valve would co-operate by slowing down the engine, and assist the brake mechanism in bringing the vehicle to a stop, or reducing its speed. It will be understood that the link rod, 24, might be directly connected with the brake mechanism and the power actuator dispensed with, if desired, in which case also, the simultaneous closing of the throttle valve would co-operate with the brake mechanism in reducing the speed of the vehicle, or bringing it to a stop.

Figure 4:
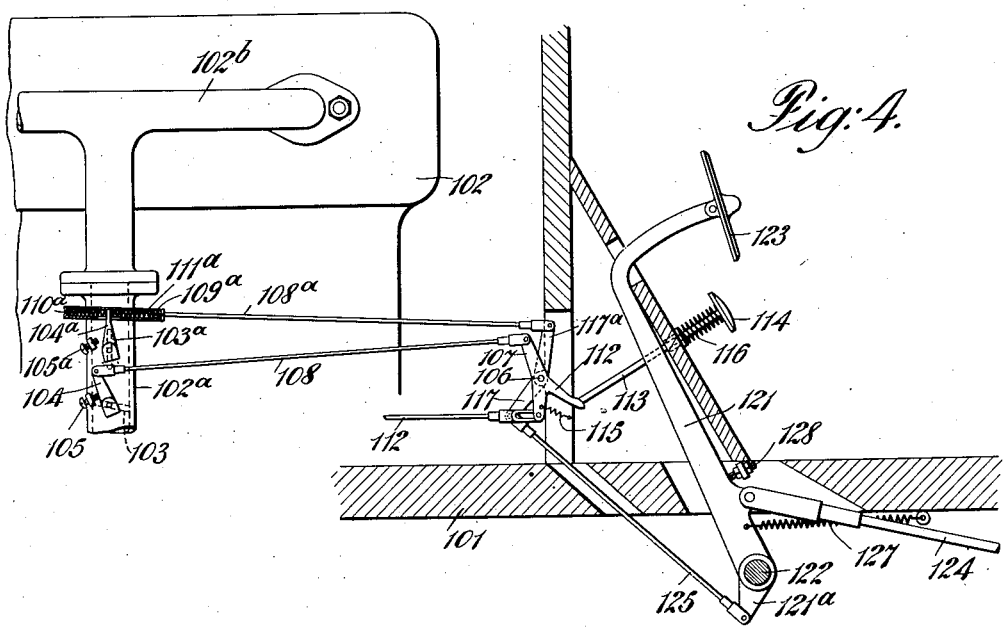
Fig. 4 is a similar view illustrating a modification, in which an independent or auxiliary throttle valve is connected with and controlled by the brake applying lever.

In Fig. 4, we have shown a slight modification of our invention, in which we do not disturb the ordinary throttle valve and its connection with its operative control mechanism, but provide the suction passage from the carburetor to the intake manifold with an additional or auxiliary throttle valve, operatively connected to the brake pedal lever entirely independently of the main throttle valve. In this figure, the parts which are identical with those in Figs. 1 and 3, are given the same numerals with 100 added, thus the passage, 102, is provided with a main throttle valve, 103, connected to the rocker arm, 107, by a link, 108, and normally held in an idling position by a spring, 115, said valve being operated by the accelerator, 113, 114, and by the usual hand lever through the slotted link rod, 112, in the usual or any preferred manner. In this instance, we have shown the passage, 102ª, provided with an auxiliary throttle valve, 103ª, having its operating arm, 104ª, connected to the link rod, 108ª, between the springs, 110ª and 111ª, and said link rod, 108ª, is shown connected with the arm, 117ª, of a separate rocker, movable independently of the main rocker, and having an arm, 117, connected by a link rod, 125, to the arm, 121ª, of the pedal lever, 121. The pedal lever, 121, is connected by a link, 124, with the valve actuating sleeve of the power actuator, as previously described, or it may be connected directly with the brake mechanism. The connections previously described are such, that the auxiliary throttle valve, 103ª, is normally held in wide open position when the brake pedal lever is in retracted position, and we prefer to provide an adjustable stop, 105ª, to arrest the valve, 103ª, when it has been moved in a direction to close it, into idling position. The springs, 110ª and 111ª, permit a shifting of the pivotal connection between the link rod, 108ª, and the arm, 104ª, after the auxiliary throttle valve, 103ª, has been moved into closed or idling position, and is arrested by the stop, 105ª, so that any further movement of the brake pedal which might be required or which might occur in the operation of the brakes, would not injure the said arm or the auxiliary throttle valve. These springs also take care of variations due to the wear of the parts.

Figure 7:
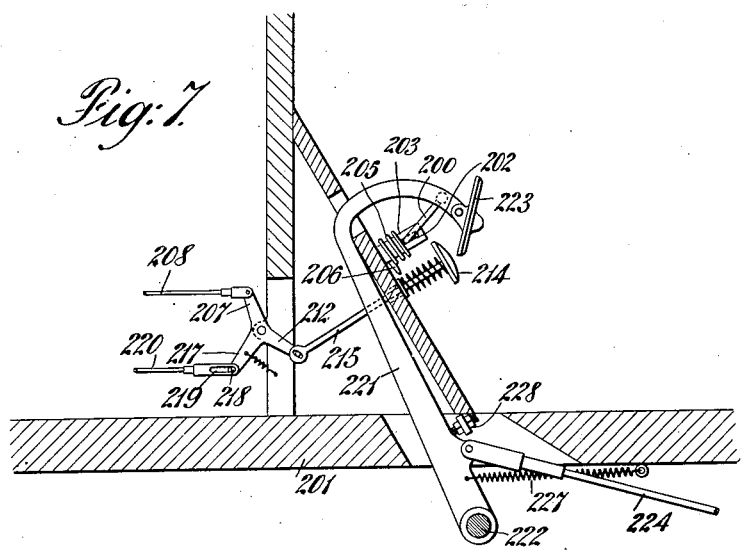
Fig. 7 represents a section on line 7—7 of Fig. 5.
Figure 5:
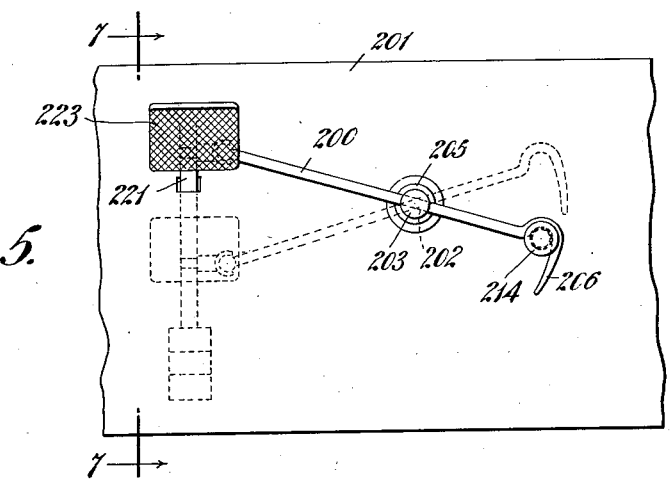
Figs. 5 and 6 are respectively a plan and elevation of another modification of our invention, in which the actuation of the brake lever in a direction to apply the brakes, raises the accelerator and permits the throttle valve to close under the action of its retracting spring.
Figure 6:
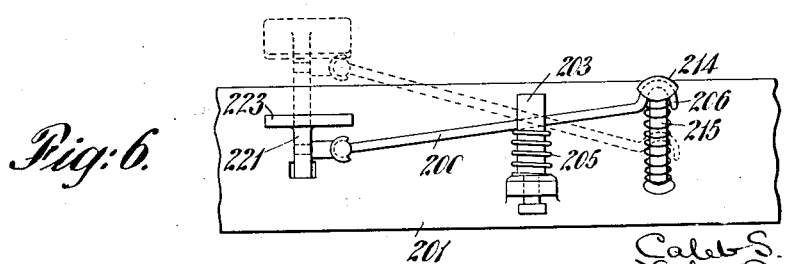

In Figs. 5, 6 and 7, we have shown another modification of our invention, in which the pedal, 223, of the pedal lever indicated at 221, is provided with a lever, 200, connected to the pedal by a ball and socket or other universal connection, said lever, in this instance, extending loosely through a slot, 202, in a post, 203, freely pivoted on the foot board, said lever being yieldingly supported in said slot by a spiral spring, 205, surrounding said post, the free end of the lever, 200, being provided with a curved or hook-shaped lifter, 206, adapted to pass beneath the mushroom head, 214, of the accelerator pin, 215, which as shown in Fig. 7, is pivotally connected with the rocker arm, 212. It will be understood, that the arm, 207, of the rocker is connected with the throttle valve by a link rod indicated at 208, and that the rocker is provided with an arm, 217, which is connected by a link rod, 220, with the hand operated throttle lever, and is provided with a slotted portion, 219, engaging a pin, 218, on the rocker arm, 217, in the manner shown in Figs. 1 and 3. The pedal lever is provided with a link rod, 224, which is connected to the valve actuating sleeve of the power actuator, or directly to the brake mechanism, if the power actuator is not employed.

In this construction, when the pedal lever is depressed to apply the brakes, the connected end of the lever, 200, will be swung forwardly and downwardly, and the hook-shaped projection, 206, will be swung rearwardly and upwardly, passing beneath the mushroom head of the accelerator and raising the accelerator pin, and effecting the closing of the throttle valve, as the brakes are applied. The post, 203, will also serve as a foot rest, if desired. It is to be understood that, when the accelerator pin is raised by the depression of the brake pedal as above described, its pivotal connection with the rocker will take the throttle valve out of the control of the hand operated throttle lever, and overcome the frictional resistance thereof, and effect the positive closing of the throttle valve.

In our former application for Letters Patent of the United States, filed February 4, 1925, Serial No. 6,733, we have described a construction in which the brakes of an automotive vehicle are applied by a power actuator under the control of valve mechanism, operated by the brake pedal lever, which is connected to the piston of the actuator by means permitting lost motion, to enable the operator to add his physical power to that of the actuator, and to operate the brakes by physical power, in case of failure of the power actuator, emergency means being provided to bring about the operation of the actuator, which can be operated by a passenger, without action on the part of the driver, and in connection therewith we have shown means similar to those illustrated in Figs. 5, 6 and 7, to positively insure the closing of the throttle valve when the brakes are applied, whether by the driver in the ordinary manner, or by the operation of the emergency means. We wish it to be understood that either of the forms herein shown and described may be used in connection with such an emergency device, and will be effective whether the brake pedal lever is depressed by the operator's foot, or by the operation of the power actuator, which may be effected by an emergency control. It will also be understood that where the form shown in Figs. 5, 6 and 7 is used with an emergency device such as is described in our former application, Serial No. 6,733, if no hand operated throttle lever is employed, the pivotal connection of the accelerator pin with rocker arm, 212, may be omitted and the pin may merely engage said rocker arm, as in Figs. 1 and 3.

It will also be understood that our invention may also be employed to shut off the power of the motor of an automotive vehicle in which other forms of motor are employed, by controlling a rheostat arm in the case of an electric motor, or the throttle valve of a steam operated motor, for example.

What we claim and desire to secure by Letters Patent is:—

1. In an automotive vehicle, the combination with an internal combustion engine for propelling the same, having a suction passage for delivering explosive charges to the engine cylinders, and a throttle valve in said passage for controlling the engine, brake mechanism for the vehicle, a vacuum operated device operatively connected with the brake mechanism, and provided with controlling valve mechanism, and a suction pipe connecting said valve mechanism with the suction passage of the engine between the throttle valve and the engine cylinder, an operator operated part connected with said valve mechanism, and operative connections between said operator operated part and the brake mechanism, of operative connections from said pedal lever to said throttle valve, for closing said valve when the operator operated part is moved in a direction to effect the application of the brakes.

2. In an automotive vehicle, the combination with an internal combustion engine for propelling the same, having a suction passage for delivering explosive charges to the engine cylinders, and a throttle valve for said engine located in said passage, operator operated means for controlling said valve, brake mechanism for the vehicle, a vacuum operated device for operating the brake mechanism, and provided with controlling valve mechanism, a suction pipe from the valve mechanism to said suction passage between the throttle valve and engine cylinders, and a pedal lever operatively connected with the controlling valve mechanism of the vacuum operated device, of connections from said pedal lever to said throttle valve for taking it out of control of its operator operated controlling means, and closing the valve when the pedal lever is moved in a direction to effect the application of the brakes.

3. In an automotive vehicle, the combination with an internal combustion engine for propelling the same, having a suction passage for delivering explosive charges to the engine cylinders, and a throttle valve for said engine located in said passage, operator operated means for controlling said valve, brake mechanism for the vehicle, a vacuum operated device for operating the brake mechanism, and provided with controlling valve mechanism, a suction pipe from the valve mechanism to said suction passage between the throttle valve and engine cylinders, and a pedal lever operatively connected with the controlling valve mechanism of the vacuum operated device, of connections from said pedal lever to said throttle valve for taking it out of control of its operator operated controlling means, and closing the valve when the pedal lever is moved in a direction to effect the application of the brakes, said connections including a slotted portion, to permit the operation of said throttle valve by its operator operated means, when the pedal lever and brake mechanism are in off position.

4. In an automotive vehicle, the combination with an internal combustion engine for propelling the same, having a suction passage for delivering explosive charges to the engine cylinders, and a throttle valve in said passage for controlling the engine, operator operated means for normally controlling said throttle valve, brake mechanism for the vehicle, a vacuum operated device operatively connected with the brake mechanism and provided with controlling valve mechanism, a suction pipe connecting said valve mechanism with said suction passage between the throttle valve and the engine cylinders, a brake pedal lever operatively connected with said controlling valve mechanism, and operative connections between the pedal lever and the brake mechanism, having provision for lost motion sufficient to permit the operation of the valve mechanism, of connections from said pedal lever to said throttle valve for taking the throttle valve out of control of the operator operated controlling means therefor, and positively closing said throttle valve when the pedal lever is moved in a direction to effect the application of the brakes, said connections permitting the operation of the throttle valve by the operator operated control means therefor, when said pedal lever and brake mechanism are in off position.

5. In an automotive vehicle operated by an internal combustion engine, the combination with a throttle valve for controlling the speed of the engine, a hand operated control device for the throttle valve, connected therewith by means permitting the independent movement of the throttle valve in a direction to open the same, brake mechanism for said vehicle, and an operator operated part for bringing said brake mechanism into operation, of connections between said operator operated part of the brake mechanism and the throttle valve for closing the throttle valve and restoring the hand operated control device therefor to normal position when the brake mechanism is brought into operation, said connections being constructed to permit the opening of the throttle valve by said hand operated device when the brake mechanism and the operator operated part for controlling the same, are in normal position.

6. In an automotive vehicle operated by an internal combustion engine, the combination with a throttle valve for controlling the speed of the engine, a hand operated control device for the throttle valve, connected therewith by means permitting the independent movement of the throttle valve in a direction to open the same, a foot operated accelerator for the throttle valve, connected therewith, brake mechanism for the vehicle, and an operator operated part for controlling the same, of connections for taking the throttle valve out of the control of said hand and foot operated control devices and closing said throttle when the brake mechanism is applied, and restoring the hand operated control device to normal position.

7. In an automotive vehicle propelled by an internal combustion engine, the combination with a throttle valve for normally controlling the speed of the engine, operator operated means for actuating said throttle valve, brake mechanism for the vehicle, and an operator operated part for bringing the brake mechanism into action, of an auxiliary throttle valve normally in open position, of operative connections between said auxiliary throttle valve and said operator operated part, to effect the closing of the auxiliary throttle valve when the brake mechanism is applied.

8. In an automotive vehicle, provided with an internal combustion engine for propelling the same, the combination with a throttle valve, and a stop for arresting said valve in idling position, operator operated means for controlling the speed of the engine, brake mechanism, an operator operated part for controlling said brake mechanism, and connections including a yielding device between said operator operated part and the throttle valve for closing the throttle when the brakes are applied.

In testimony whereof we affix our signatures.

CALEB S. BRAGG.
VICTOR W. KLIESRATH.